(12) United States Patent
Goh et al.

(10) Patent No.: US 7,136,524 B1
(45) Date of Patent: Nov. 14, 2006

(54) ROBUST PERCEPTUAL COLOR IDENTIFICATION

(75) Inventors: King-Shy Goh, Palo Alto, CA (US); Edward Y. Chang, Santa Barbara, CA (US); Yuan-Fang Wang, Goleta, CA (US)

(73) Assignee: Proximex Corporation, Sunnyvale, CA (US)

( * ) Notice: Subject to any disclaimer, the term of this patent is extended or adjusted under 35 U.S.C. 154(b) by 0 days.

(21) Appl. No.: 11/229,091

(22) Filed: Sep. 16, 2005

(51) Int. Cl.
*G06K 9/00* (2006.01)

(52) U.S. Cl. .................. 382/167; 382/156; 382/157

(58) Field of Classification Search .............. 382/162, 382/167, 103, 156–157, 190, 2, 74, 305; 358/518–523; 707/104.1; 345/419
See application file for complete search history.

(56) References Cited

U.S. PATENT DOCUMENTS

| | | | | |
|---|---|---|---|---|
| 5,473,369 A | * | 12/1995 | Abe | 348/169 |
| 5,912,980 A | * | 6/1999 | Hunke | 382/103 |
| 6,072,496 A | * | 6/2000 | Guenter et al. | 345/419 |
| 6,404,900 B1 | * | 6/2002 | Qian et al. | 382/103 |
| 6,625,315 B1 | * | 9/2003 | Laumeyer et al. | 382/190 |
| 6,628,829 B1 | * | 9/2003 | Chasen | 382/167 |
| 6,707,487 B1 | * | 3/2004 | Aman et al. | 348/169 |
| 6,711,587 B1 | * | 3/2004 | Dufaux | 707/104.1 |

* cited by examiner

Primary Examiner—Jingge Wu
Assistant Examiner—Ali Bayat
(74) Attorney, Agent, or Firm—Carr & Ferrell LLP

(57) ABSTRACT

Systems and methods of robust perceptual color identification are disclosed. The methods include a multilevel analysis for determining the robust perceptual color of an object based on observed colors. This multilevel analysis can include a pixel level, a frame level, and/or a sequence level. The determination may make use of color drift matrices and trained functions such as statistical probability functions. The color drift tables and function training are based on training data generated by observing objects of known robust perceptual color in a variety of circumstances. Embodiments of the invention are applicable to the identification and tracking of objects, for example, in a surveillance video system.

19 Claims, 3 Drawing Sheets

| 300 | BK | WT | RD | BL | YL | GN | PP | PK | OG | BN | GY |
|---|---|---|---|---|---|---|---|---|---|---|---|
| BK | O |   |   | X | X |   | X | X |   | X | X |
| WT |   | O |   | X | X | X |   |   |   |   | X |
| RD |   |   | O |   |   |   | X | X | X |   |   |
| BL | X |   |   | O |   |   | X | X |   |   | X |
| YL |   |   |   |   | O |   |   |   |   |   | X |
| GN |   |   |   |   |   | O |   |   |   |   |   |
| PP | X |   | X |   |   |   | O | X |   | X | X |
| PK |   |   | X |   |   |   | X | O | X |   | X |
| OG |   |   |   |   | X |   |   |   | O |   | X |
| BN |   |   |   |   |   |   |   | X | O |   | X |
| GY | X | X |   | X | X |   | X | X | X | X | O |

FIG. 3

ROBUST PERCEPTUAL COLOR IDENTIFICATION

BACKGROUND

1. Field of the Invention

The invention is in the field of image analysis and more specifically in the field of color identification in digital images.

2. Related Art

The identification of an object's color can be useful, for example when attempting to locate and/or identify the object. However, when an object is viewed through a camera a robust perceptual color of the object may not be readily apparent. For example, an orange object can appear to be partly purple, pink, or brown under different lighting conditions and when observed using different cameras. The robust perceptual color, or the true color, of an object is informally defined to be the object's color perceived under some standard viewing, lighting, and sensing configurations (e.g., when the surface is viewed head on under neutral lighting conditions.) Several factors may lead to an observed color that is different from a robust perceptual color. These factors include the physical content of the scene surrounding the object, the angle at which the object is viewed, object surface characteristics, the illumination of the object, characteristics of the camera, etc. Thus, the observed color of an object can change as the object moves between regions of different illumination and as it is observed at different angles or when using different cameras.

Despite decades of research in color identification, algorithms capable of reliably identifying the robust perceptual color of an object in motion have not yet been developed. Most of the existing algorithms assume constant or slowly changing scene illumination. Further, most color identification algorithms depend on reliable estimates of parameters such as angles between light sources and the object, reflection angles, and surface materials. Typical approaches involve complicated nonlinear mathematical relationships and analysis that would be extremely difficult in real-time. Further, the required parameters can be unknown or difficult to determine in practice. Thus, the requirements of existing color identification algorithms make them impractical for use in most real world situations, particularly when an object is moving.

Surveillance applications are an example of real world situations where existing algorithms have failed to achieve robust perceptual color identification. In surveillance applications, one or more camera is used to observe an area and the movement of objects, such as people, within that area. For example, a camera may be used to observe a parking lot, secured area, or airport lobby. Existing algorithms are incapable of identifying the robust perceptual color of clothing worn by a person moving through one of these observed areas in real-time. Therefore, robust perceptual color is unavailable as a tool for identifying the moving person. There is, therefore, a need for improved systems and methods of identifying the robust perceptual color of an object.

SUMMARY

Typical systems and methods of the invention include a multilevel approach to robust perceptual color identification. This approach is practical in real world situations, including those in which an object is moving through various lighting conditions. For example, some embodiments of the invention can be used in surveillance applications to monitor movement of people within an observed environment. The robust perceptual color identification achieved by the invention is optionally used to identify and/or track individuals.

In some embodiments, the multilevel approach to robust perceptual color identification includes a pixel level analysis, a frame level analysis, and a sequence level analysis. The pixel level analysis includes, for example, the consideration and classification of individual pixels. In some instances, individual pixel data is categorized into a reduced set of colors. The frame level analysis includes the use of a plurality of pixels within an image frame or part thereof. For example, frame level analysis may include statistical processing of a set of pixels believed to include an image of a person's shirt. The sequence level analysis includes statistical processing of data from more than one image, e.g., more than one still image or more than one video frame. The sequence level analysis is optionally coupled with tracking software such that pixels representative of an object in one image can be analyzed along with different pixels representative of the same object in a second image. In some embodiments, only one or two of the levels discussed above are included in the determination of robust perceptual color. For example, in some embodiments the levels of analysis used include the frame level analysis and the sequence level of analysis but not the pixel level analysis.

The analysis performed at any level optionally includes the use of color drift patterns. For example, classification of an observed color at the pixel or frame level can include use of a color drift matrix for the purposes of training the classification process. A color drift matrix is a matrix representative of how a robust perceptual color may be seen as an observed color and vice versa. Some embodiments of the invention include the development of a color drift matrix for use in robust perceptual color identification. The color drift matrix is optionally used in conjunction with categorization of observed colors into a reduced set of common colors.

Some embodiments of the invention include a statistical approach to robust perceptual color identification that is differentiated from the prior art, in part, because it does not depend on nonlinear modeling of illumination, surface reflectance, surface orientation, extended light, secondary reflection, shadow, reflectivity, camera characteristics, etc. Without these prior art dependencies, robust perceptual color identification is possible in real world situations, and is optionally used to identify an object, e.g., a person, as the object moves within the field of view of a camera, or optionally from the field of view of one camera to the field of view of a second camera.

Various embodiments of the invention include a method comprising performing a frame level evaluation including analysis of a first plurality of pixels representative of an object in an image in order to determine a robust perceptual color of the object, and performing a sequence level evaluation in order to improve the accuracy of the determination of the robust perceptual color of the object, the sequence level evaluation including analysis of a second plurality of pixels representative of the object, the second plurality of pixels being derived from a plurality of images including the object under a variety of observation conditions.

Various embodiments of the invention include a system comprising a first image sensor configured to generate an image including an object, and an image processor configured to determine a robust perceptual color of the object using at least a frame level analysis and a sequence level analysis, the image processor including image data storage, frame level logic, sequence level logic, and a drift matrix storage configured to store a color drift matrix for use in the frame level analysis.

Various embodiments of the invention include a system comprising means for acquiring a sequence of images including an object, means for determining a robust perceptual color of the object using at least two of a pixel level analysis, a frame level analysis and a sequence level analysis.

Various embodiments of the invention include a system comprising the use of a color calibration pattern that is made of multiple standard, known color cells; means of positioning the pattern in front of the camera to obtain multiple instances of the sensed colors of these standard, known color cells under different lighting conditions and poses; and means of determining the sensed-color and true-color mapping using statistical analysis at pixel, frame, and sequence levels.

Various embodiments of the invention include a method comprising (a) obtaining an image including an object of known robust perceptual color, (b) generating data by identifying pixels that are representative of the object within the image, the identified pixels being associated with observed colors, resulting from the known robust perceptual color and being representative of observed colors to which the known robust perceptual color can drift, (c) repeating steps (a) and (b) for a variety of robust perceptual colors, and (d) aggregating the data generated in each repetition of step (b) to determine a color drift matrix. In some of these embodiments, the color drift matrix includes one or more values representative of a probability that a particular robust perceptual color will drift to a particular observed color.

Various embodiments of the invention include a method of identifying an object in a digital image, the method comprising collecting a first image using a first camera, determining the robust perceptual color of the object within the first image using a sequence level analysis, and comparing the determined robust perceptual color with a reference color in order to identify the object by color. Some of theses embodiments further including tracking the object based on the comparison between the determined robust perceptual color and the reference color.

BRIEF DESCRIPTION OF THE DRAWINGS

FIG. 3 is an example of a color drift matrix according to various embodiments of the invention.

DETAILED DESCRIPTION

Figure 1:
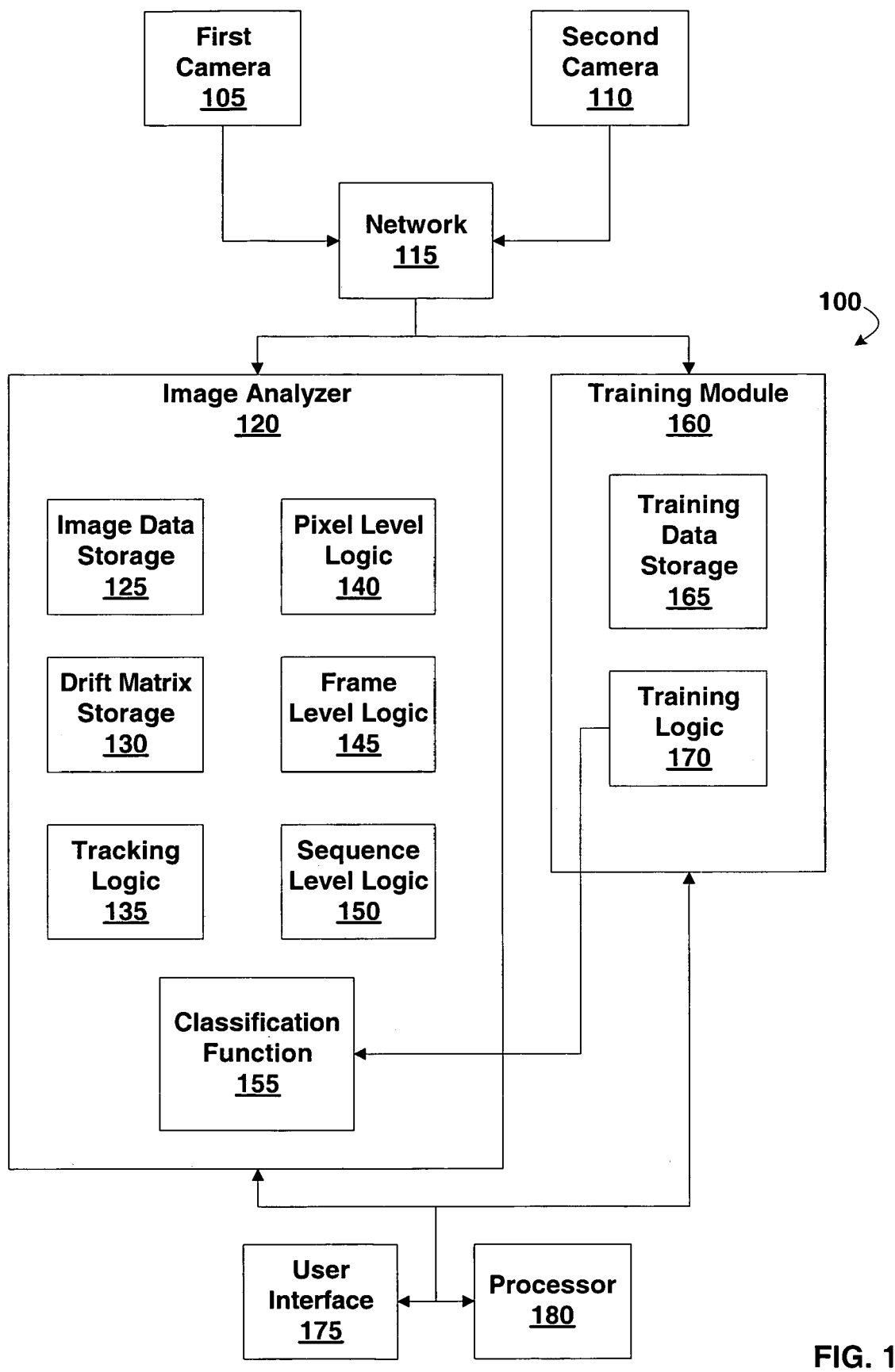
FIG. 1 is a block diagram of an image analysis system, according to various embodiments of the invention.

Various embodiments of the invention include determination of a robust perceptual color based on observed color data received from an optical sensor such as a camera. Either a robust perceptual color or an observed color can be defined by three values representative of three primary colors that can be combined to produce the true or observed color. For example, observed color data can include RGB (red, green, and blue) data including 256 possible values for each of the primary colors red, green and blue. Alternatively, a true or observed color can be defined by HSL (hue, saturation, lightness) or some other color definition system.

The determination of a robust perceptual color is facilitated by the categorization of the universe of possible colors into an optionally reduced set of colors. For example, in some embodiments, the reduced set of colors includes black, white, red, yellow, green, blue, brown, purple, pink, orange, and gray. These colors are optionally selected because they have been found to be commonly recognized by people in a substantial majority of human cultures. The use of a reduced set of colors may reduce random fluctuation resulting from small variations in perceived color. In addition, the reduced set of colors simplifies the use of queries to identify objects having a single color. For example, a query can include the term "brown" to cover a range of colors that include a naturally understood subset of colors within all possible RGB or HSL colors, etc. Finally, the use of a reduced set of colors greatly simplifies the determination of a color drift matrix and the statistical analysis of observed colors. For the purposes of illustration, the above reduced color set is used in the examples presented herein. However, it is to be understood that different reduced color sets, including more or fewer colors, could be used in alternative embodiments of the invention.

A color drift matrix is a matrix that is representative of how a robust perceptual color may be observed under different conditions (e.g., how a robust perceptual color can drift). For example, a robust perceptual color of blue may be observed as black, white or gray under various conditions. Thus, depending on the color sensor, the angle of view, the illumination, etc., a blue shirt may be observed as blue, black, white or gray. Likewise, a color drift matrix can be representative of which possible robust perceptual colors are present when a color is observed. For example, an observed color of white may result from a robust perceptual color of blue, yellow, green and/or gray. In some embodiments, a color drift matrix includes all possible observed colors, e.g. $256^3$ possible RGB colors, and a reduced set of robust perceptual colors. In alternative embodiments, a color drift matrix includes both a reduced set of observed colors and a reduced set of robust perceptual colors. A color drift matrix may be embodied in a table, array, linked list, or other data structure.

A color drift matrix may be determined, in part, by imaging an object of a known robust perceptual color using a color sensor. For example, data to be included in a color drift matrix may be generated by having a person wearing a shirt of a known robust perceptual color walk within the field of view of a camera under various lighting conditions. A complete color drift matrix can be generated by using shirts of various materials and known colors. This results in a color drift matrix appropriate for a particular color sensor. In some circumstances, it may be preferable to generate a separate color drift matrix for each color sensor. Alternatively, a single color drift matrix may be generated by aggregating data recorded using several color sensors. This results in a color drift matrix that takes in to account variations between image sensors.

A color drift table may alternatively be determined using a color calibration pattern including, for example, cells arranged in a rectangular grid layout. These cells are populated with different instances of color samples of known robust perceptual color values. The pattern can be positioned manually or placed on a turntable that can be panned and tilted automatically. Sensed colors with the pattern held at various different orientations and poses can be used to determine how a particular robust perceptual color can appear under different lighting and sensing conditions and how it can drift into other colors.

As is discussed further herein, a color drift matrix can be used to help determine a robust perceptual color based on observed color data at one or more of three different levels: a pixel level, a frame level and a sequence level.

In addition to a color drift matrix, various embodiments of the invention include a learning system that uses a set of training data to train, e.g., develop, a classification function configured for classifying observed colors into a set of robust perceptual colors. This learning process may be based on neural networks, data mining, statistical learning, or other technique in which a function can be trained from a set of training data. For the purposes of illustration, a statistical learning approach is discussed herein. This statistical learning approach includes use of a support vector machine. Support vector machines are learning machines that can perform binary classification (pattern recognition) tasks. Once trained, support vector machines can map their n-dimensional input space, e.g., observed color, into an m-dimensional feature space, e.g., robust perceptual color classification. A training data set for use in the learning process can be generated by observing objects of known robust perceptual color under a varied range of real world conditions. Thus, as with the color drift matrix, training data can be generated by having a person wearing a shirt of a known robust perceptual color walk within the field of view of a camera under various lighting conditions, etc. Similarly, the same learning system can utilize sensed color and robust perceptual color mapping data collected from a color calibration pattern as described herein.

As is discussed further herein, methods according to various embodiments of the invention include training data generation, development of a color drift matrix, training of the classification function, color classification, and object tracking. The classification process may include one or more of a pixel level classification, a frame level classification, and a sequence level classification.

FIG. 1 is a block diagram of an Imaging System, generally designated 100, according to various embodiments of the invention. Imaging System 100 may be used, for example, in a video surveillance system. Imaging System 100 optionally includes one or more cameras, such as a First Camera 105 and a Second Camera 110. First Camera 105 and Second Camera 110 may each serve as a color sensor configured to generate an array of RGB data representative of an image. First Camera 105 and Second Camera 110 are optionally configured to convey data through a Network 115, such as a computer network, telephone network, wireless network, close circuit television network, or the like.

An Image Analyzer 120, included in Imaging System 100, is configured to receive image data, such as that generated by First Camera 105 and/or Second Camera 110, and to classify observed color within the received image data using various methods described herein. Image Analyzer 120 includes Image Data Storage 125 configured to store image data to be processed. This image data may include a still image, a portion of an image, and/or a sequence of images.

Image Analyzer 120 further includes Drift Matrix Storage 130 configured to store data representative of one or more color drift matrices. For example, in some embodiments, Drift Matrix Storage 130 includes a color drift matrix configured to represent color drift patterns associated with both First Camera 105 and Second Camera 110. In some embodiments, Drift Matrix Storage 130 includes a color drift matrix configured to represent color drift patterns associated with First Camera 105 and a separate color drift matrix configured to represent color drift patterns associated with Second Camera 110.

Image Analyzer 120 optionally further includes Tracking Logic 135 configured for tracking an object. The tracked object may be a person, vehicle, container, animal, product, or other object. Tracking Logic 135 is optionally configured to track an object based, at least in part, on the color of the object. For example, based on a determined robust perceptual color, Tracking Logic 135 may be configured to identify an object, to reacquire a previously acquired object being tracked, or to track an object from the field of view of a first camera to the field of view of a second camera. In some embodiments, Tracking Logic 135 is configured to identify (e.g., acquire) an object, attempt to track the object, and then to reacquire the object based in part on a robust perceptual color determination if the object is lost (e.g., tracking momentarily fails). In some embodiments, Tracking Logic 135 is configured to track an object as part of a video surveillance system. Tracking Logic 135 is comprised of computing instructions, software, firmware, and/or hardware.

Image Analyzer 120 optionally also includes logic (e.g., software, firmware, hardware or the like) for extracting pixel colors from a color calibration pattern. This logic is configured to first identify the four corners of a calibration grid pattern in an image. Based on the locations of the four corners, the logic can automatically calculate and draw cell partition lines among the grid cells. Optionally, a user can interactively move these cell partition lines if so desired. The logic automatically extracts sensed pixel colors from each grid cell to be used in the ensuing statistical color analysis.

Image Analyzer 120 further includes optional Pixel Level Logic 140 configured for processing an image at the pixel level, Frame Level Logic 145 configured for processing an image at the frame level, and Sequence Level Logic 150 configured for processing a sequence of images in combination. The processing methods used by Pixel Level Logic 140, Frame Level Logic 145 and Sequence Level Logic 150 are described further herein. Pixel Level Logic 140, Frame Level Logic 145 and Sequence Level Logic 150 are comprised of computing instructions, software, firmware, and/or hardware.

Image Analyzer 120 further includes a Classification Function 155 configured for determining a robust perceptual color based on one or more observed color. Classification Function 115 is a function trained using observed colors resulting from an object of known robust perceptual color. In some embodiments, Classification Function 115 is trained by observing an object of known robust perceptual color using First Camera 105 and/or Second Camera 110. In some embodiments, Classification Function 115 is trained using other color sensors. In these embodiments, images obtained from First Camera 105 and/or Second Camera 110 are optionally used to confirm that Classification Function 155 is configured to properly process observed colors obtained using these cameras.

Classification Function 155 is trained using a Training Module 160, optionally included in Imaging System 100. Training Module 160 is configured to train the classification function using training data and methods described further herein. The training data is optionally obtained using First Camera 105 and/or Second Camera 110. Training Module 160 includes a Training Data Storage 165 configured to store the training data, and a Training Logic 170 configured to train Classification Function 155. Once trained, Classification Function 155 is optionally used to classify observed colors in images obtained using color sensors other than First Camera 105 and/or Second Camera 110. Training Logic 170 and/or Classification Function 155 are comprised of computing instructions, software, firmware, and/or hardware.

Imaging System 100 further optionally includes a User Interface 175 configured for a user to control and direct Image Analyzer 120 and/or Training Module 160. User Interface 175 can include, for example, a computer screen, a graphical user interface, a keyboard, a client computing device, or the like.

Imaging System 100 further includes a Processor 180 configured for executing the various types of logic included in Image Analyzer 120 and/or Training Module 160. Processor 180 typically includes one or more circuits, software, firmware, or other logic configured to execute computing instructions. In some embodiments, Processor 180 includes a plurality of distinct integrated circuits.

Figure 2:
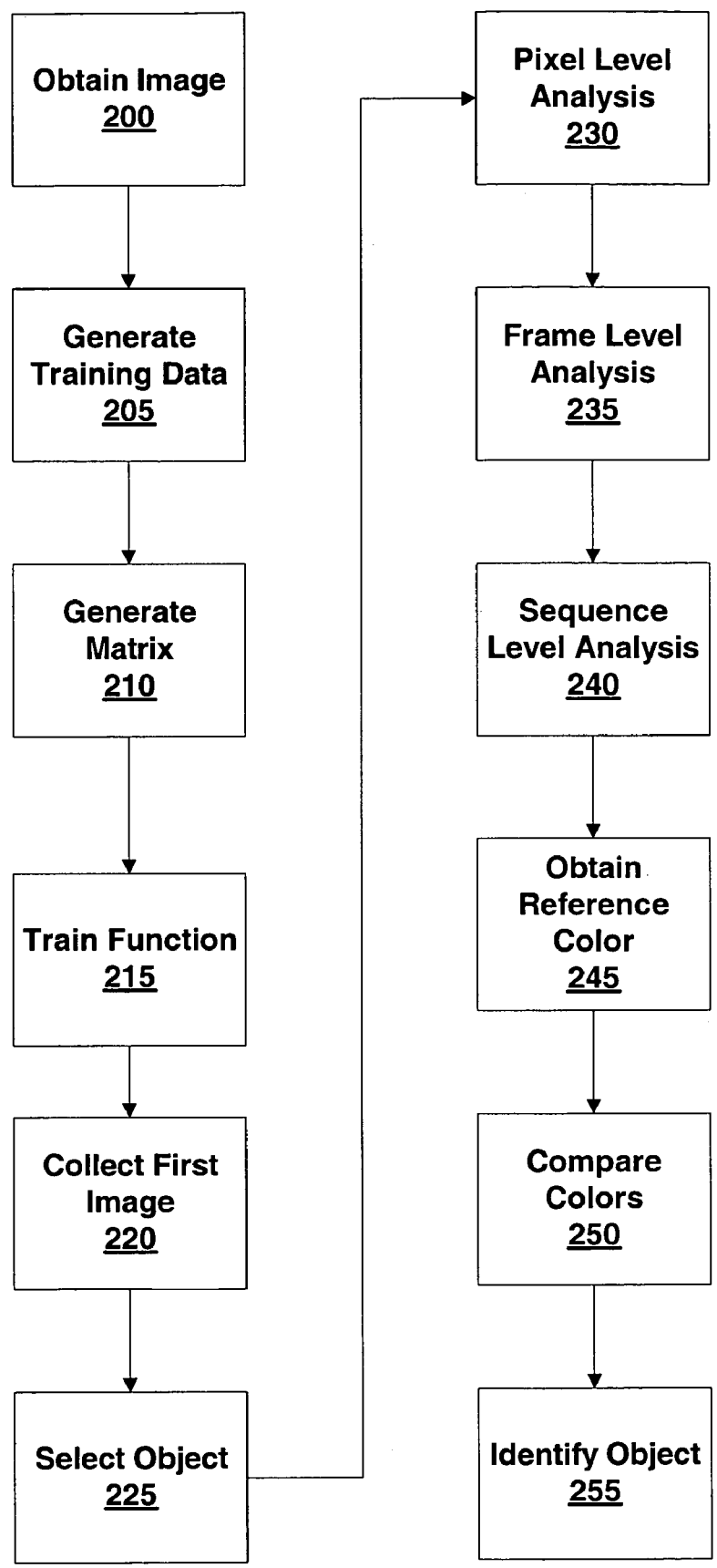
FIG. 2 is a flowchart illustrating methods according to various embodiments of the invention.

FIG. 2 is a flowchart illustrating methods according to various embodiments of the invention. Generally, these methods can be divided into four segments: data mining, function training, color classification, and object identification. These segments may be performed separately and independently. For example, the data mining and function training segments may be performed using Training Module 160. These segments result in a trained function and or color drift matrix that can then be distributed for use in one or more instances of Image Analyzer 120. The segments of color classification and object identification can then be performed using Image Analyzer 120. Thus, in systems where a classification function has already been trained, the data mining and function training segments are optional.

The data mining segment includes an Obtain Image Step 200 and a Generate Training Data Step 205. In Obtain Image Step 200, one or more images of one or more objects having respective known robust perceptual colors are collected. These images may include still images or video frames extracted from a video sequence. While these images are preferably collected using the same image sensors (e.g., cameras), lighting, surroundings and other conditions that may be later used to collect images of an object whose robust perceptual color is to be determined, an identity of circumstances is not required. The one or more images obtained in Obtain Image Step 200 may be of a standard object, such as a cube having a primary color (e.g., training color) on each face. It has been found that, where it is desirable to generate data representative of a range of object orientations and lighting conditions, the standard object can be a colored shirt worn by a person in the image. Thus, in some embodiments, Obtain Image Step 200 includes generating video sequences of a person walking around in the field of view of one or more cameras (e.g., First Camera 105 and/or Second Camera 110). It is desirable to generate such images using a variety of different colored shirts. In some embodiments, the different colored shirts include at least one shirt representative of each of the possible robust perceptual color classifications. Thus, in an embodiment wherein observed colors are classified into a reduced set of eleven colors including black, white, red, yellow, green, blue, brown, purple, pink, orange, and gray, Obtain Image Step 200 may include generation of at least eleven video sequences, each including a person wearing a shirt of a different one of these eleven colors.

In other embodiments, Obtain Image Step 200 includes the use of more than one known training color for each possible color classification. For example, two or more shirts each having different shades of green may be used. Thus, the number of training colors used is optionally substantially larger than the final reduced set of classification colors. Further, a single shirt having more than one color may be used.

Furthermore, in alternative embodiments, a calibration pattern comprising cells of multiple color samples can be used in Obtain Image. Step 200. The calibration pattern can be presented at a wide range of orientations and poses to the camera to generate sensed color data that are representative of a large number of possible viewing conditions. This experimental setup may provide improved color sampling efficiency and the ease of image analysis for extracting sensed color with minimal manual intervention.

In one illustrative embodiment, Obtain Image Step 200 includes the collection of video sequences using three different cameras simultaneously. Each of the video sequences includes a person walking in the field of view of the cameras while wearing a black, white, red, yellow, green, blue, brown, purple, pink, orange, or gray shirt. Each color shirt is observed under, for example, 5 different overall lighting conditions, thus yielding a total of 165 video sequences (3×11×5=165).

In Generate Training Data Step 205, the observed colors of the objects (e.g., of the shirts) used in Obtain Image Step 200 are extracted from the obtained one or more image. In some embodiments, the extraction process includes selecting pixels in each image representative of a particular shirt. In some embodiments, the extraction process includes the use of an object-tracker to automatically locate and track the shirt within video sequences. Such object trackers are known in the art, see for example, the OpenCV Computer Vision Library located at http://www.intel.com/technology/computing/opencv/ Those pixels identified by the object tracker as being representative of the shirt are extracted. In some embodiments, the extraction process includes the use of the object tracker followed by manual removal of noise, e.g., manual removal of any pixels that the object tracker misidentified as being representative of the shirt.

Obtain Image Step 200 optionally includes use of a color calibration pattern. In some embodiments, the observed colors from multiple samples of color cells within a color calibration pattern are extracted using the following process. First, the four corners of the color calibration pattern in an image are identified manually using a simple graphical user interface that allows the user to position the mouse cursor at those corners and click a mouse button, or alternatively the four corners are identified automatically using Image Analyzer 120. Image Analyzer 120 is then used to automatically compute grid lines across the color calibration pattern. These gridlines are representative of the divisions of color cells. The user can optionally adjust the positions of the grid lines, again using a simple graphical user interface. Once grid lines are determined, an automated extraction process selects pixels within each identified grid cell. This particular procedure does not require that the color calibration pattern be tracked between different images in a multi-image sequence.

At the conclusion of Generate Training Data 205, a set of training data representative of a series of objects of known robust perceptual color has been generated. This training data typically includes observed colors resulting from a range of different object positions, object locations, object surface angles, lighting, color sensors, and other observation conditions. Thus, the training data is representative of how the robust perceptual colors may be observed in a variety of real world conditions. This data is optionally stored in Training Data Storage 165 (FIG. 1).

The function training segment of the methods illustrated by FIG. 2 includes a Generate Matrix Step 210 and a Train Function Step 215. In this segment, the training data, generated using Obtain Image Step 200 and Generate Training Data Step 205, are used to train a classification function and/or generate a color drift matrix. The resulting color drift matrix and/or classification function are used to classify observed colors as described further herein. Either Generate Matrix Step 210 or Train Function step 215 may be optional, depending on what classification processes are to be later used. As the number of pixels included in the training data can be large, a sampling approach is optionally used to select a portion of all of the training data for training purposes.

In Generate Matrix Step 210, a color drift matrix is generated for the test colors used in Generate Training Data Step 205. An illustrative example of a Color Drift Matrix 300 is shown in FIG. 3. In this case, the test colors include black, white, red, yellow, green, blue, brown, purple, pink, orange, and gray. These colors are indexed by a first Column 310. BK=black, WT=white, RD=red, BL=blue, YL=yellow, GN=green, PP=purple, PK=pink, OG=orange, and GY=gray. The observed colors resulting from each of the test colors are indexed by a First Row 320. In the illustrated embodiment, the set of observed colors includes the same colors as the robust perceptual colors. However, as pointed out elsewhere herein, in alternative embodiments, there can be more test colors than observed colors. The observed colors shown in Color Drift Matrix 300 are not necessarily representative of one actual observed pixel color, rather they are typically representative of a reduced set of color ranges. Thus, each of the columns in Color Drift Matrix 300 represents a range of colors within the set of all possible pixel colors. For example, blue (BL) may represent many shades and types of blue. Each of these ranges is predetermined and may be specified, for example, in terms of RGB or HSL value ranges.

Color Drift Matrix 300 is generated by plotting the colors observed in the images generated using each of the known robust perceptual colors. For example, in the images of a green (GN) shirt, the observed colors may experimentally be found to include black (BK), white (WT), blue (BL), and green (GN) itself. In Color Drift Matrix 300, this information is represented by an "X" or an "O" in the corresponding cell. For example, that a robust perceptual color of orange can drift to an observed color of red is indicated by an "X" in Cell 330. Likewise, that a robust perceptual color of brown can drift to purple is indicated by an "X" in Cell 340. Each robust perceptual color may be observed as it self. For example, orange may be observed as orange as indicated by the "O" in cell 350. The absence of an "X" or "O" is indicative that a robust perceptual color was not found to drift to an observed color.

In alternative embodiments, the cells of Color Drift Matrix 300 include numeric values indicative of the frequency at which a robust perceptual color was found to drift to an observed color. For example, if it were found that orange was observed as red 10% of the time, then cell 330 would include the value 0.10. In practice, the drift pattern can be systematically tabulated by using the Classification Function 155. For example, a color that is known to be, red can be observed under multiple viewing and lighting conditions. Under different conditions, the Classification Function 155 may assign the observed colors as, say, being red, black, or green. The frequencies of occurrences of different class labels are stored in the Color Drift Matrix 300.

Color Drift Matrix 300 is optionally stored in Drift Matrix Storage 130 of one or more instances of Image Analyzer 120 (FIG. 1).

Returning to FIG. 2, Train Function Step 215 includes training of a classification function to classify observed colors, using Training Logic 170 and the training data generated in Obtain Image Step 200 and Generate Training Data Step 205. The purpose of the trained function is to determine the robust perceptual color of an object based on the observed color, e.g., to classify an observed color into one of a set of robust perceptual colors. The trained function may be a non-linear function such as a neural network or statistical function. For example, in some embodiments the trained function includes a support vector machine as a base learning algorithm. General discussion of support vector machines can be found in Vapnik, V. N. *Statistical Learning Theory*, Wiley, New York, N.Y., 1998.

In some embodiments, the training process includes determining a separate one-per-class support vector machine function for each of the color classifications, e.g., eleven functions for eleven possible robust perceptual color classes. These functions are indicative of the probability that any particular robust perceptual color will result in an observed color within each class, and vice versa. For example, if a pixel is observed to be black (as represented by an RGB value received from an image sensor) then one of the one-per-class support vector machine functions can be used to determine the probability that the robust perceptual color is red. Another of the one-per-class support vector machine functions can be used to determine the probability that the robust perceptual color is purple.

Mathematically, each one-per-class support vector machine function can be represented by $$C_i = f_i(x)$$

where $C_i$ is the $i^{th}$ classification class, $f_i(\ )$ is the $i^{th}$ classification function, and x is the observed color.

$C_i$ may be an uncalibrated value. As such, $C_m$ may not be directly comparable with $C_n$. However, $C_i$ may be mapped to a calibrated probability value, for example, using Gaussians to model the class-conditional probability $$P(f|C_i = \pm 1)$$

where $C_i$ is a semantic label. General details of this mapping process can be found in Hastie, T. and Tibshirani, R. "Classification by Pairwise Coupling," in *Advances in Neural Information Processing Systems* (1998), M. I. Jordan, M. J. Kearns, and S. A. Solla, Eds., vol. 10, MIT Press.

Bayes' rule can then be used to compute a posterior probability (that the robust perceptual color is $C_i$ given an observed color x) as $$p(C_i = 1 \mid x) = \frac{p(f(x) \mid C_i = 1)P(C_i = 1)}{\sum_{i=-1,1} p(f(x) \mid C_i = i)P(C_i = i)}$$

where $P(C_i=i)$ is the prior probability of $C_i=i$ calculated from the training data set. In some embodiments it is inferred that the posterior probability function is a sigmoid with an analytic form:

$$p(C_i = 1 \mid x) = \frac{1}{1 + \exp(af(x)^2 + bf(x) + c)}$$

In other embodiments the posterior probability $P(C_i=1|x)$ is fit directly by a parametric model. Details of this approach can be found in Platt, J. "Probabilistic Outputs for SVMS and Comparisons to Regularized Likelihood Methods," in *Advances in Large Margin Classifiers* (1999), MIT Press.

Using this approach, it is not necessary to estimate the conditional probability $p(f|C_i)$ for each $C_i$ value.

In some embodiments, a parametric form of a sigmoid is used as the parametric model. For example, some embodiments use the form $$p(C_i = 1 \mid x) = \frac{1}{1 + \exp(A \times f(x) + B)}$$

The parameters A and B of this equation are fitted using maximum likelihood estimation from the training data set. More precisely, in some embodiments, A and B are obtained by minimizing the negative log likelihood of the sigmoid training data using a model-trust minimization algorithm. The function is trained for color classification by determining values for A and B.

The result of this training is a posterior probability function $p(C_i=1|x)$ that can be used to calculate the probability that any given observed color results from each of the robust perceptual colors. These probabilities can then be compared and used for color classification. In some embodiments, an observed color is classified as being generated from the most likely robust perceptual color, e.g., the observed color is assigned to the class $C_i$ where $p(C_i=1|x)$ is greatest.

The trained classification function is optionally stored in Image Analyzer 120 as Classification Function 155.

The color classification segment of the methods illustrated by FIG. 2 includes a Collect First Image Step 220, a Select Object Step 225, a Pixel Level Analysis Step 230, a Frame Level Analysis Step 235 and a Sequence Level Analysis Step 240.

In Collect First Image Step 220, one or more images are collected, for example, using First Camera 105 and/or Second Camera 110. The collected images are optionally part of a sequence of images, such as a video frame sequence. The collected images are optionally received by Image Analyzer 120 via Network 115 and stored in Image Data Storage 125.

In Select Object Step 225, an object within the one or more images collected in Collect First Image Step 220 is selected for analysis. Select Object Step 225 and the following analysis are optionally performed for a plurality of objects within any given image. The object selection may be accomplished using an object tracker, of which several are known in the prior art. Alternatively, an object may be selected via User Interface 175 by a user of Image Analyzer 120. For example, a user may select a color calibration pattern from within the one or more images.

The robust perceptual color of the selected object is determined using one or more analysis procedures. These analysis procedures may include, for example, a pixel level analysis in which each pixel representative of an object of interest is classified, a frame level analysis in which pixel-level determinations of robust perceptual color classification are aggregated to form a frame-level determination of the robust perceptual color of the object of interest, and/or a sequence-level analysis in which patterns of color drift are used to further improve the accuracy of the determination. These analysis procedures are applied in Pixel Level Analysis Step 230, Frame Level Analysis Step 235 and Sequence Level Analysis Step 240, respectively. In various embodiments, one or more of these steps are optional. For example, some embodiments rely on Frame Level Analysis Step 235 and Sequence Level Analysis Step 240 without the use of Pixel Level Analysis Step 230, some embodiments rely on Pixel Level Analysis Step 230 and Sequence Level Analysis Step 240 without the use of Frame Level Analysis Step 235, and some embodiments rely on Pixel Level Analysis Step 230 and Frame Level Analysis Step 235 without use of Sequence Level Analysis Step 240. Some embodiments rely on Sequence Level Analysis Step 240 without the use of Pixel Level Analysis Step 230 and Frame Level Analysis Step 235.

In optional Pixel Level Analysis Step 230, determinations of robust perceptual color are made on a pixel by pixel basis using Pixel Level Logic 140 (FIG. 1). Typically, each pixel, representative of the object of interest, is classified according to a reduced set of possible robust perceptual colors, for example, the colors shown in Color Drift Matrix 300. In some embodiments, Pixel Level Analysis Step 230 includes classifying each possible RGB color into one of colors in the reduced set of robust perceptual colors. This may be accomplished by assigning each observed RGB color to a predetermined member of the robust perceptual color classes.

In Frame Level Analysis Step 235, determinations of robust perceptual color are made on a frame by frame basis using Frame Level Logic 145. Within each frame, aggregated sets of pixels associated with an object of interest are assumed to result from the same robust perceptual color and are used as a set to determine that robust perceptual color. Thus, an optionally large set of pixels from within a single video frame or still image are analyzed as a group in order to determine a robust perceptual color value likely to have resulted in the observed colors. In practice, only those pixels that are thought to be associated with a specific object are processed in this group. If there is more than one identified object within a frame, then the frame level analysis is optionally performed separately for each object.

In some embodiments, the frame level analysis is performed by aggregating pixel-level results for a specific frame. One approach to this aggregation is to generate a frame-level result by selecting the most common pixel-level result. Another approach is to use a color drift matrix, such as that illustrated by FIG. 3, to weigh pixel determinations. For example, if the pixel level analysis results in pixels whose observed colors include black, blue and red, then Color Drift Matrix 300 can be used to determine that the only robust perceptual color that can produce this set of results is purple. If the use of Color Drift Matrix 300 is not determinative (e.g., there is more than one possible robust perceptual color that could generate the observed colors), then a probability analysis may be used to eliminate the excess candidates, or alternatively the excess candidates may be eliminated during sequence level analysis in Sequence Level Analysis Step 240.

In alternative embodiments, the frame level analysis is performed without the benefit of the pixel-level analysis. In these embodiments, the pixel-level analysis is optional. For each frame and object of interest, a histogram is generated. For example, in a system using a reduced set of eleven robust perceptual colors, an eleven bin histogram is generated. A value within each bin is representative of the frequency of pixels including observed colors that fall into a color range represented by that bin. The histogram is representative of an eleven dimensional vector, each dimension representing one of the color classes. The eleven dimensional vector is further representative of the percentage of pixels associated with the object of interest that includes a specific color. The distance between an observed color histogram (e.g., vector) generated by observing an object of interest, and a histogram generated using a test object of known robust perceptual color is representative of the probability that an observed object of interest is of the same robust perceptual color as the test object.

In some embodiments, the distance between two histograms is calculated as the sum of the differences in each dimension. This distance is commonly referred to as the L1 distance and, for an eleven bin histogram, can be represented by $$L1(P, Q) = \sum_{i=1}^{11} |w_{pi} - w_{qi}|$$

where P is the first histogram, $w_{p1} \ldots w_{p11}$ represent the percentage of pixels in each bin 1 through 11, Q is the second histogram, and $W_{q1} \ldots w_{q11}$ represent the percentage of pixels in each bin 1 through 11. An observed set of pixel colors is assigned a single robust perceptual color classification for which the calculated distance is minimal. This assignment is reported as the result of the frame level analysis.

In alternative embodiments, a color drift matrix may be used to narrow the distance between two colors that can drift into each other, and penalize the distance between two colors that cannot drift into each other. For example, in some embodiments, the distance between two histograms is calculated based on the amount of work necessary to transform one histogram into the other. This work may be calculated using the earth-mover function described by Rubner, Y., Tomasi, C., and Buibas, L. J. "The Earth Mover's Distance as a Metric for Image Retrieval," in *International Journal of Computer Vision* 40 (2000), 99–121. More specifically, the minimal work required to transform one histogram into another can be expressed as $$\text{WORK}(P, Q, F) = \sum_{i=1}^{11} \sum_{i=1}^{11} d_{ij} f_{ij}$$

subject to a set of constraints, where $f_{ij}$ denotes the flow between feature $p_i$ of P and $q_i$ of Q. The flow may be thought of as the amount of work required to move a feature per unit distance. $d_{ij}$ denotes the ground distance between feature $p_i$ of P and feature $q_i$ of Q. Thus, $d_{ij}$ is representative of the number of distance units through which a feature must be moved. $d_{ij}$ is optionally determined from Color Drift Matrix 300. If color i drifts into color j according to Color Drift Matrix 300, then $d_{ij}$ is assigned $d_{ij}=1-t_{ij}$ where $t_{ij}$ is the percentage of color i that drifts to color j. If color i does not drift into color j, then $d_{ij}$ is assigned $d_{ij}=1.0$ or some large number. Finally, if i=j then $d_{ij}=0$.

Once a minimal transportation problem is solved, the earth-mover distance between P and Q can be calculated as $$EMD(P, Q) = \frac{\sum_{i=1}^{11} \sum_{j=1}^{11} d_{ij} f_{ij}}{\sum_{i=1}^{11} \sum_{j=1}^{11} f_{ij}}$$

Once the pair-wise distances are determined based on training data, the information can be stored to a kernel matrix and used for frame level classification as part of Classification Function 155.

In Frame Level Analysis Step 235, the observed histogram is compared, using the above equation, with each of the predetermined histograms resulting from objects of known robust perceptual color. The object of interest is assigned a robust perceptual color according to which of the predetermined histograms has the minimum earth-mover distance. For example, if the predetermined histogram with minimum earth-mover distance from the observed histogram was generated using a blue object, then the observed colors are classified as blue.

In Sequence Level Analysis Step 240, Sequence Level Logic 150 is configured to determine a robust perceptual color based on a sequence of images including an object of interest. The sequence of images includes a plurality of images that may or may not be sequential. For example, the sequence of images may be a video sequence of a person walking within the field of view of a camera, a subset or sampling of images extracted from a video sequence, a plurality of still images recorded with one or more camera, or the like. The object of interest may be moving, thus, by analyzing a sequence of images the object of interest may be observed under a variety of different lighting conditions and at a variety of different angles. This additional information is used to determine a robust perceptual color of the object of interest. In some embodiments, Sequence Level Analysis Step 240 is configured to improve the accuracy of a robust perceptual color determination made in Frame Level Analysis Step 235 and/or Pixel Level Analysis Step 230.

The sequence level analysis may aggregate the results of analyses at the frame level. In addition, more than one heuristic may be used in the sequence level analysis. For example, various embodiments may use a color drift rule, a temporal rule and/or a spatial rule for determining robust perceptual color. As an object moves between frames, an object tracker is optionally used to determine which pixels of each frame can be assumed to be representative of the object. Those pixels representative of the same object are then processed together in the sequence analysis. In alternative embodiments, the sequence level analysis includes those methods discussed herein with respect to frame level analysis except that the frame level analysis is applied to a set of pixels aggregated from several frames.

In those embodiments using the color drift rule, each of the different frames are used to reduce the number of possible robust perceptual colors candidates as determined using a color drift matrix, such as Color Drift Matrix 300. For example, if at the pixel level or the frame level analysis of a first frame results in more than one possible robust perceptual color, analysis of a second frame may be used to reduce the number of possible robust perceptual colors. More specifically, if a first frame includes an observed color of blue, then according to Color Drift Matrix 300 the robust perceptual color may be blue, black, white, or gray. Then if a second frame includes an observed color of purple for the same object, then based on that frame alone, the possible robust perceptual colors may be black, red, blue, pink and gray. Considering both of these results, the possible robust perceptual colors are reduced to the intersection of the results obtained independently from each of the two frames. In this example, the intersection leaves, blue, black and gray. If a third frame includes an observed color of orange, then the possible robust perceptual colors are reduced further to just gray. Following this multi-frame sequence analysis procedure, the set of possible robust perceptual colors may be, in general, reduced. When, as in a video sequence, a number of frames including a specific object are available, each of the frames may be used to further reduce the set of possible robust perceptual colors. The reduction in possible robust perceptual colors may be based on results from pixel level analysis and/or frame level analysis.

In those embodiments using the temporal rule, a color determination is made after a set number of frames have been observed. For example, 3, 5, 10 or 24 frames. The result of this analysis is optionally based, at least in part, on the most common result of each of the frame-level analyses. This rule may be used in combination with one or more of the other rules discussed herein.

In those embodiments using the spatial rule, certain spatial locations, are identified as being especially dark or especially light, thus resulting in a substantial deviation between the observed and robust perceptual colors. These locations are specifically ignored or discounted in the sequence analysis. An object's location can be inferred from the position of the object within a frame and the object's distance from an image sensor. The distance to an object is optionally inferred from the size of a bounding box around the object in question. This rule is optionally used in combination with one or more of the other rules discussed herein.

The object identification segment of the methods illustrated in FIG. 2 includes an Obtain Reference Color Step 245, a Compare Colors Step 250 and an Identify Object Step 255. In these steps, an object of interest is identified based on a match between a reference color and determined robust perceptual color.

In Obtain Reference Color Step 245, a reference color is obtained. Obtaining the reference color can include a user entering a color through User Interface 175. For example, a user may enter "blue," "yellow," "green," "purple," etc. in order to indicate a robust perceptual color classification. Alternatively, obtaining a reference color can be facilitated by a prior observance of an object and a prior determination of robust perceptual color based on that observation. For example, an object of interest may be observed once in the field of view of a camera and then lost (e.g., by passing behind an obstruction or leaving the field of view). The reference color for that object may be determined by determining a robust perceptual color based on the first observation. As described further herein, this reference color may then be used in reacquiring a previously acquired and lost object or otherwise further tracking of an object. In some embodiments, a reference color may be determined using First Camera 105 and then later used to reacquire the object of interest within the field of view of Second Camera 110. Thus, the object identification segment of the methods illustrated in FIG. 2 is optionally used for tracking an object between image sensors.

In Compare Colors Step 250, the reference color obtained in Obtain Reference Color Step 245 is compared with a determined robust perceptual color of an object observed in one or more images. This determined robust perceptual color may be calculated using the color classification segment of the methods illustrated by FIG. 2 (e.g., Steps 220–240). The result of this comparison is typically either that the determined robust perceptual color is identical to the reference color, or not.

In Identify Object Step 255, an object is identified based, at least in part, on a match between the determined robust perceptual color and the reference color. This identification may include the reacquisition of an object previously tracked. Alternatively, the identification may be part of a query process in which images are searched for an object having certain characteristics, e.g., a specific robust perceptual color classification.

Several embodiments are specifically illustrated and/or described herein. However, it will be appreciated that modifications and variations are covered by the above teachings and within the scope of the appended claims without departing from the spirit and intended scope thereof. For example, the systems and methods discussed herein may be applied to objects having more than one robust perceptual color. Further, the various steps discussed herein may be performed in a variety of orders. For example, Step 245 optionally occurs prior to the color classification segment of the methods illustrated in FIG. 2.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:

performing a frame level evaluation including analysis of a first plurality of pixels representative of an object in an image in order to determine a robust perceptual color of the object; and performing a sequence level evaluation in order to improve the accuracy of the determination of the robust perceptual color of the object, the sequence level evaluation including analysis of a second plurality of pixels representative of the object, the second plurality of pixels being derived from a plurality of images including the object under a variety of observation conditions.

2. The method of claim 1, further including performing a pixel level evaluation in which an observed color as represented by one or more pixels is classified into a reduced set of robust perceptual color classifications.

3. The method of claim 1, further including performing a pixel level evaluation using a trained function.

4. The method of claim 1, further including performing a pixel level evaluation using a support vector machine.

5. The method of claim 1, further including performing a pixel level evaluation using a color drift matrix.

6. The method of claim 1, wherein the robust perceptual color is represented by a reduced set of color classifications.

7. The method of claim 1, wherein the frame level evaluation includes aggregating pixel-by-pixel determinations of robust perceptual color.

8. The method of claim 1, wherein the frame level evaluation includes use of a color drift matrix.

9. The method of claim 1, wherein the frame level evaluation includes calculation of a distance between data sets.

10. The method of claim 1, wherein the frame level evaluation includes use of a distance function.

11. The method of claim 1, wherein the sequence level evaluation includes determining robust perceptual color using a certain number of images from within the sequence of images.

12. The method of claim 1, wherein the sequence level evaluation includes application of a spatial rule.

13. The method of claim 1, wherein the sequence level evaluation includes discounting data obtained while the object is in particularly dark or bright locations.

14. A system comprising:
 a first image sensor configured to generate an image including an object; and
 an image processor configured to determine a robust perceptual color of the object using at least a frame level analysis and a sequence level analysis, the image processor including
  image data storage,
  frame level logic,
  sequence level logic, and
  a drift matrix storage configured to store a color drift matrix for use in the frame level analysis.

15. The system of claim 14, wherein the image processor is further configured to determine the robust perceptual color using a pixel level analysis based on a trained function.

16. The system of claim 14, further including a training module configured for training a statistical classification function for use by the image processor.

17. The system of claim 14, further including a second image sensor configured to generate a second image including the object, and tracking logic configured to track the object from the field of view of the first image sensor to the field of view of the second image sensor using the determined robust perceptual color of the object.

18. The system of claim 14, wherein the sequence level logic includes a temporal rule requiring a certain number of frames be used to determine a robust perceptual color of an object.

19. The system of claim 14, wherein the sequence level logic includes a spatial rule configured to discount data obtained while the object is in certain spatial locations.

* * * * *